United States Patent
Burczyk et al.

(10) Patent No.: US 7,497,127 B2
(45) Date of Patent: Mar. 3, 2009

(54) PRESSURE-DIFFERENCE PICKUP WITH DYNAMIC OVERLOAD PROTECTION

(75) Inventors: Dietfried Burczyk, Teltow (DE); Wolfgang Dannhauer, Teltow (DE)

(73) Assignee: Endress+Hauser GmbH+Co. KG, Maulburg (DE)

( * ) Notice: Subject to any disclaimer, the term of this patent is extended or adjusted under 35 U.S.C. 154(b) by 0 days.

(21) Appl. No.: 11/547,971

(22) PCT Filed: Mar. 23, 2005

(86) PCT No.: PCT/EP2005/051343

§ 371 (c)(1), (2), (4) Date: Aug. 6, 2007

(87) PCT Pub. No.: WO2005/098387

PCT Pub. Date: Oct. 20, 2005

(65) Prior Publication Data

US 2008/0127738 A1 Jun. 5, 2008

(30) Foreign Application Priority Data

Apr. 7, 2004 (DE) .................. 10 2004 017 580

(51) Int. Cl.
*G01L 13/02* (2006.01)
*G01L 15/00* (2006.01)

(52) U.S. Cl. .................. 73/716; 73/706; 73/715; 73/727

(58) Field of Classification Search ........... 73/700–756; 361/283.1–283.4
See application file for complete search history.

(56) References Cited

U.S. PATENT DOCUMENTS 4,072,058 A 2/1978 Whitehead (Continued)

FOREIGN PATENT DOCUMENTS

DE 27 18 873 A1 11/1977

(Continued)

*Primary Examiner*—Andre J Allen
*Assistant Examiner*—Jermaine Jenkins
(74) *Attorney, Agent, or Firm*—Bacon & Thomas, PLLC

(57) ABSTRACT

A pressure-difference pickup includes a hydraulic body, in which an overload chamber, with an overload membrane, or diaphragm, is formed, which divides the overload chamber into a first half-chamber and a second half-chamber, wherein the first half-chamber is in communication with a first hydraulic measuring path extending between a first pressure intermediary and a first side of a pressure-difference measuring cell, and the second half-chamber is in communication with a second hydraulic path extending between a second pressure intermediary and a second side of the pressure measuring cell. Additionally, between at least the first half-chamber and the first hydraulic measuring path, there are arranged, on the one hand, a first hydraulic overload element having a snap-disc behavior relative to an excess pressure from the first hydraulic measuring path, and, on the other hand, a first hydraulic balancing path extending parallel to the first hydraulic measuring path. The hydraulic resistance of the first hydraulic balancing path is greater than the resistance of the first hydraulic measuring path.

10 Claims, 1 Drawing Sheet

U.S. PATENT DOCUMENTS

| | | | |
|---|---|---|---|
| 4,173,149 A | * | 11/1979 | Critten et al. .................. 73/706 |
| 4,218,925 A | * | 8/1980 | DiDomizio, Jr. .............. 73/706 |
| 4,285,244 A | | 8/1981 | Green |
| 4,329,877 A | | 5/1982 | Hershey |
| 4,342,231 A | * | 8/1982 | Yamamoto et al. ............ 73/721 |
| 4,370,890 A | * | 2/1983 | Frick ........................... 73/718 |
| 4,539,850 A | * | 9/1985 | Ziegler ........................ 73/706 |
| 4,776,218 A | | 10/1988 | Sawa |
| 4,995,266 A | * | 2/1991 | Tobita et al. ................... 73/706 |
| 5,319,981 A | * | 6/1994 | Mei et al. ...................... 73/706 |
| 6,543,291 B1 | * | 4/2003 | Kurtz et al. .................... 73/716 |

FOREIGN PATENT DOCUMENTS

| | | |
|---|---|---|
| DE | 27 18 931 A1 | 11/1977 |
| DE | 33 41 987 C2 | 5/1985 |
| DE | 196 08 321 A1 | 8/1997 |
| DE | 297 11 759 U1 | 9/1998 |

* cited by examiner

PRESSURE-DIFFERENCE PICKUP WITH DYNAMIC OVERLOAD PROTECTION

The present invention relates to pressure-difference pickups, or transducers, with hydraulic pressure transfer to a measuring element by means of a transfer liquid, especially such pressure-difference pickups having an overload membrane, or diaphragm.

BACKGROUND OF THE INVENTION

A pressure-difference pickup of such type is disclosed, for example, in Offenlegungsschrift DE 196 08 321 A1. Pressure-difference pickups include a hydraulic body, in which an overload chamber with an overload membrane is constructed. The overload membrane divides the overload chamber into a high-pressure half and a low-pressure half, with the high-pressure half communicating with a first hydraulic path extending between a first pressure intermediary (including a separating membrane, or diaphragm, over a membrane bed) and the high-pressure side of a pressure measuring cell, and the low-pressure half communicating with a second hydraulic path extending between a second pressure intermediary (including a separating membrane, or diaphragm, on a membrane bed) and the low pressure side of the measuring element.

In the case of large overloads, the transfer liquid is pressed completely out of the pressure intermediary, and the separating membrane comes to rest against the membrane bed. The transfer liquid pushed into the relevant hydraulic path in the case of overload pressure leads to a deflection of the overload membrane, in order to accommodate the additional volume and reduce the overload pressure.

The stiffer the overload membrane, the faster the measurement cell reacts to pressure fluctuations. This is especially important in the case of sensors with pressure intermediary appendages connected with the sensor via a long capillary line. The long capillary line has a large hydraulic resistance and forms with the overload membrane an RC-element. A soft overload membrane with a large hydraulic capacitance can lead to large time constants, i.e. long response times. In principle, however, even a short hydraulic measurement path, coupling a pressure intermediary (perhaps itself even integrated in a hydraulic body) with a pressure measurement cell, forms, together with an overload membrane, an RC-element, which can affect the dynamics of the measurement.

Currently used overload membranes exhibit, to a first approximation, a constant capacitance, i.e. a linear characteristic curve. That is, the volume increase dV is proportional to the pressure change dP. In this way, already in the measuring range, the dynamics of the pressure difference pickup are affected by the overload membrane.

SUMMARY OF THE INVENTION

It is, therefore, an object of the invention to provide a difference pressure pickup, which overcomes the described disadvantages.

The object is achieved according to the invention by a pressure difference pickup which includes:

A hydraulic body containing an overload chamber with an overload membrane dividing the overload chamber into a first half-chamber and a second half-chamber; wherein the first half chamber communicates with a first hydraulic measuring path, which extends between a first pressure intermediary, including a first separating membrane, and a first side of a pressure difference measuring cell, and the second half-chamber communicates with a second hydraulic path, which extends between a second pressure intermediary and a second side of the pressure measuring cell; and wherein, further, between at least the first half-chamber and the first hydraulic measuring path, there are arranged a first hydraulic overload element having a snap-disc behavior relative to an excess pressure from the first hydraulic measuring path, and a first hydraulic balancing path extending in parallel with the first hydraulic measuring path.

The snap-disc behavior refers to a behavior, in which, up to a certain limit value of an excess pressure from the first hydraulic measuring path, only a negligibly small deflection of the overload element occurs, and in which, upon exceeding of the limit value, a large deflection of the overload element occurs, in that snap-through occurs. The limit value lies, preferably, outside of the measuring range of the pressure-difference pickup.

The overload element effects, that the dynamics of the hydraulic measuring path is scarcely affected in the measuring range, since deflections of the overload element are largely avoided. When, in contrast, a pressure-difference overload builds quickly, then the limit value for the snapping of the overload element is reached, upon which the required volume shifting of the transfer liquid can take place, in order to bring the first separating membrane to rest and to prevent a further pressure increase.

For implementing this snap-disc behavior, the first hydraulic overload element includes a first, at least sectionally domed, membrane.

The first overload element of the pressure-difference pickup should hinder deflection of the overload membrane as little as possible in the case of excess pressure from the second hydraulic measuring path. To this end, the first hydraulic overload element has, in the face of excess pressure from the direction of the first overload chamber, a hydraulic capacitance, which amounts to at least one-times, preferably at least two-times, further preferably at least four-times, the hydraulic capacitance of the overload membrane in the rest position. Accordingly, the first hydraulic overload element can, without significant pressure increase, absorb the volume of transfer liquid displaced in the case of a deflection of the overload membrane in the direction of the first hydraulic overload element.

For this purpose, the first hydraulic overload element can include a membrane supported in the rest position at least sectionally against excess pressure from the first hydraulic measuring path.

In a first embodiment of the pressure-difference pickup according to this point of view of the invention, the first, at least sectionally domed membrane has a central, domed section, which is surrounded by an annular section, which, in the rest position, is supported against excess pressure from the first hydraulic measuring path.

In a second embodiment, the two membranes are decoupled, i.e. the first hydraulic overload element includes, besides a first, at least sectionally domed membrane, for example, a first annular membrane, which surrounds the first, at least sectionally domed membrane, with the first annular membrane being supported in the rest position against excess pressure from the first hydraulic measuring path.

In a variant of the second embodiment of the pressure-difference pickup according to this point of view of the invention, there is arranged parallel to the first, at least sectionally domed membrane, a second membrane, which is supported in its rest position against excess pressure from the first hydraulic measuring path.

The first hydraulic, balancing path serves for handling temperature-dependent volume fluctuations of the transfer liquid. The enclosed volume between the overload membrane and the first hydraulic overload element remains, therefore, essentially independent of the temperature of the transfer liquid, and temperature-dependent deflections of the overload element are avoided. This is advantageous to the extent that a temperature-dependent deflection of the overload element would undermine the snap-disc behavior of the overload element in the case of a warming of the overload element.

Currently, it is preferred to have the hydraulic resistance of the first hydraulic balancing path be greater than the resistance of the first hydraulic measuring path. This effects, especially, that, in the case of rapid pressure difference fluctuations in the measuring range of the pressure difference pickup, the dynamics of the first hydraulic measuring path are scarcely affected by the first hydraulic balancing path.

The first hydraulic balancing path can include, for example, an opening in a membrane, for example the first domed membrane, or a duct in the hydraulic body, with the latter being led around the first domed membrane.

It is helpful to have, likewise, a second hydraulic overload element arranged between the second pressure intermediary and the second overload chamber. The embodiments of the first hydraulic overload element apply analogously for the second hydraulic overload element.

Further details of the invention will follow from the example of an embodiment shown in the drawing, the sole FIGURE of which shows as follows:

DETAILED DESCRIPTION

Figure 1:
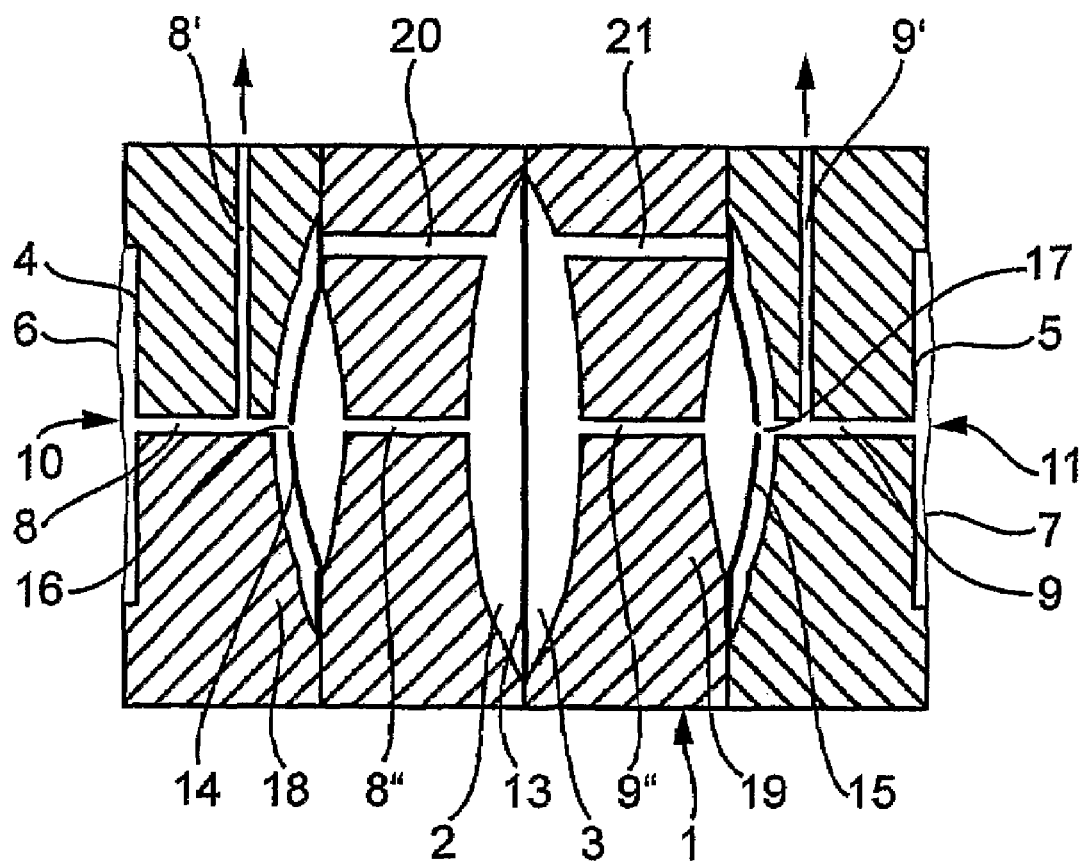
FIG. 1a is a sectional drawing through a pressure-difference pickup of the invention.

The pressure-difference pickup shown in FIG. 1 includes an essentially cylindrical hydraulic body 1, which has, on each of its end faces, a membrane, or diaphragm, bed 4, 5, over each of which is secured a separating membrane, or diaphragm, 10, 11. Formed between each separating membrane and membrane bed is, in each case, a pressure-intermediary chamber 10, 11, from which, in each case, a hydraulic measuring path 8, 8', 9, 9' extends into the interior of the hydraulic body 1 and to a measuring cell (not shown). The measuring cell can, as indicated in the drawing, be located outside of the hydraulic body, or it can be positioned in a suitable location in the hydraulic body. The hydraulic measuring paths are, in such case, each hydraulically coupled via respective first and second overload ducts 8'', 9'' with respective first and second overload half-chambers 2, 3, with an overload membrane, or diaphragm, 13 being arranged between the first and second overload half-chambers.

Between the hydraulic measuring paths 8, 9 and the overload half-chambers 2, 3 is located, in each case, an overload element with snap-disc behavior. The overload elements comprise, in each case, a domed membrane, or diaphragm, 14, 15, and annular membrane, or diaphragm, 18, 19.

The annular membranes are affixed each on its inner edge and on its outer edge to the hydraulic body, and they communicate, in each case, via a relief duct 20, 21, with one of the overload chambers 2, 3. The annular membranes 18, 19 are, on the one hand, soft, and, on the other hand, supported in the rest position against excess pressure from the respective measuring paths by a membrane bed. I.e., they have, per se, a large hydraulic capacitance, which, however, because of the support, is available only for excess pressure from the respective overload chambers, and, as a result, a hydraulic capacitance of zero for excess pressure from the respective measuring path.

The domed membranes 14, 15 exhibit a snap-disc behavior and are so selected that they have a negligibly small hydraulic capacitance, up to a limit value of excess pressure from the respective measuring path, and, upon the exceeding of the limit value, do snap through, this then leading to a very large capacitance. The snap-through effects that all oil can be expelled from the involved pressure intermediary chamber and, consequently, a further pressure increase is avoided. Snap-through of the domed membrane 14, 15 is, additionally, accompanied by a volume displacement of the transfer liquid into the respective overload chamber and a deflection of the overload membrane 13. As a result of this, transfer liquid is shifted out of the other overload chamber in the direction of the other overload element. This transfer liquid is shifted through the relief duct 20, 21, beneath the soft, annular membrane 18, 19.

The membrane beds of the domed membranes 14, 15 are, preferably, in each case, so formed, that the domed membranes, in the case of overload, do not completely snap-through, but, instead, are supported by the membrane bed in such a position that they can, by themselves, snap back, as soon as the overload goes away, in order to enable a continuing of the measuring.

The domed membranes 14, 15 have, additionally, in each case, a small opening 16, 17, which enables a volume balancing in the case of temperature fluctuations of the transfer liquid. The openings 16, 17 exhibit, in each case, a considerably greater hydraulic resistance than the measuring path, so that the dynamics of the respective measuring paths are scarcely affected by the openings.

The measuring cell can be any suitable pressure-difference measuring cell used by those skilled in the art. The type of measuring cell does not affect the present invention.

The invention claimed is:

1. A pressure-difference pickup, comprising:
   a hydraulic body, in which an overload chamber with an overload membrane is present, with said overload membrane dividing said overload chamber into a first half-chamber and a second half-chamber, said first half-chamber is in communication with a first hydraulic measuring path, which extends between a first pressure intermediary and a first side of a pressure-difference measuring cell, and the second half-chamber is in communication with a second hydraulic path, which extends between a second pressure intermediary and a second side of the pressure measuring cell; and
   a first hydraulic overload element having a snap-disc behavior relative to an excess pressure from said first hydraulic measuring path; wherein:
   said first hydraulic balancing path extending in parallel with said first hydraulic measuring path, and
   said first hydraulic overload element and said first hydraulic balancing path are arranged between at least said first half-chamber and said first hydraulic measuring path.

2. The pressure-difference pickup as claimed in claim 1, wherein:
   said hydraulic resistance of said first hydraulic balancing path is greater than the resistance of said first hydraulic measuring path.

3. The pressure-difference pickup as claimed in claim 1, wherein:
said hydraulic overload element comprises a first, at least sectionally domed, membrane.

4. The pressure-difference pickup as claimed in claim 3, wherein:
said first hydraulic balancing path comprises an opening in said membrane.

5. The pressure-difference pickup as claimed in claim 3, wherein:
said first hydraulic balancing path comprises a duct in said hydraulic body.

6. The pressure-difference pickup as claimed in claim 1, wherein:
said first hydraulic overload element exhibits, relative to excess pressure from said first overload chamber, a hydraulic capacitance, which is at least as large as the hydraulic capacitance of said overload membrane, and, preferably, as least two-times, more preferably at least four-times, the hydraulic capacitance of said overload membrane, in a rest position.

7. The pressure-difference pickup as claimed in claim 1, wherein:
said first hydraulic overload element comprises a membrane supported in a rest position at least sectionally against excess pressure from said first hydraulic measuring path.

8. The pressure-difference pickup, as claimed in claim 3, wherein:
said first hydraulic overload element comprises, besides a first, at least sectionally domed membrane, a first annular membrane, which surrounds said first, at least sectionally domed, membrane, wherein said first annular membrane is supported in a rest position against excess pressure from said first hydraulic measuring path.

9. The pressure-difference pickup, especially as claimed in claim 3, wherein:
parallel to a first, at least sectionally domed, membrane, a second membrane is arranged, which is supported in a rest position against excess pressure from said first hydraulic measuring path.

10. The pressure-difference pickup as claimed in claim 1, wherein:
between said second half-chamber and said second hydraulic measuring path, are arranged: a second hydraulic overload element having a snap-disc behavior relative to an excess pressure from said second hydraulic measuring path; and a second hydraulic balancing path extending in parallel with said second hydraulic measuring path.

* * * * *